United States Patent [19]

Heess et al.

[11] Patent Number: 4,786,034
[45] Date of Patent: Nov. 22, 1988

[54] APPARATUS FOR DAMPING COURSES OF MOVEMENT

[75] Inventors: Gerhard Heess, Tamm, Fed. Rep. of Germany; Dean Karnopp, Davis, Calif.

[73] Assignee: Robert Bosch GmbH, Stuttgart, Fed. Rep. of Germany

[21] Appl. No.: 11,657

[22] Filed: Feb. 5, 1987

[30] Foreign Application Priority Data

Apr. 2, 1986 [DE] Fed. Rep. of Germany ....... 3610937

[51] Int. Cl.$^4$ .......................... F16F 5/00; B60G 17/04
[52] U.S. Cl. .............................. 267/64.15; 267/64.11; 267/64.16; 188/312; 188/314; 188/322.13
[58] Field of Search ............... 188/311, 312, 313, 314, 188/315, 316, 318, 322.13, 97.1; 267/64.13, 64.11, 64.15, 126, 64.16, 8 C

[56] References Cited

U.S. PATENT DOCUMENTS

| | | | |
|---|---|---|---|
| 2,764,404 | 9/1956 | Mercier | 267/8 C |
| 2,765,054 | 10/1956 | Rossman | 188/311 |
| 3,689,103 | 9/1972 | Meulendyk | 267/64.16 |
| 3,877,347 | 4/1975 | Sheesley et al. | 188/313 |
| 4,655,440 | 4/1987 | Ecker | 267/64.11 |

FOREIGN PATENT DOCUMENTS

| | | | |
|---|---|---|---|
| 667228 | 7/1963 | Canada | 188/97.1 |
| 3414258 | 10/1985 | Fed. Rep. of Germany | 267/64.16 |
| 1275827 | 5/1972 | United Kingdom | 188/313 |

Primary Examiner—Andres Kashnikow
Assistant Examiner—Mark T. Le
Attorney, Agent, or Firm—Edwin E. Greigg

[57] ABSTRACT

In an apparatus for damping courses of movement of two bodies or masses moving at variable velocities relative to one another and in their absolute positions, in particular for damping resilient wheel suspension systems in vehicles, in which a piston dividing a cylinder into two work chambers is dampingly affected in its particular movement direction (tension stage, compression stage) by controlled hydraulic throttle valves connected in series or in parallel with one another, parallel to the throttle valves, respective check valves opening in the opposite direction are provided, wherein the connections of all the valves remote from the work chamber connections are joined together and that a separate passive and (semi-) active damping effect be initiated. The necessary bandwidth of the frequency response of the electrohydraulic valves of apparatuses of this kind can be reduced drastically as a result.

12 Claims, 3 Drawing Sheets

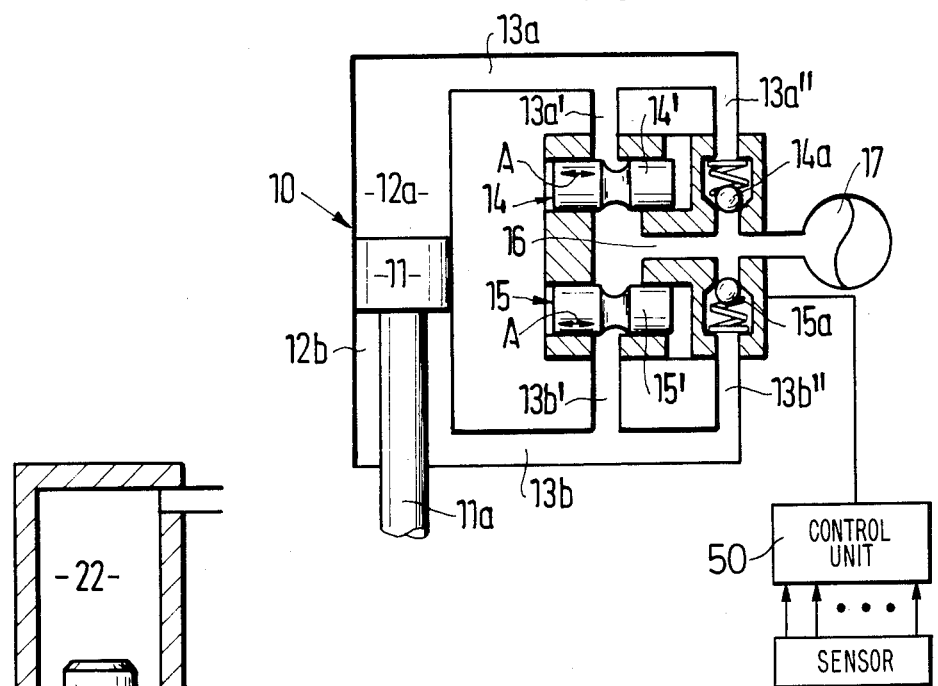
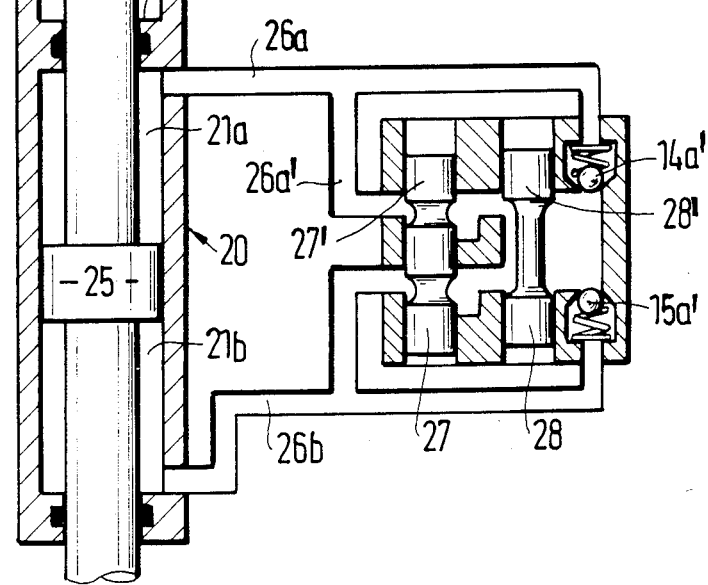

4,786,034

APPARATUS FOR DAMPING COURSES OF MOVEMENT

BACKGROUND OF THE INVENTION

The invention relates to an apparatus for damping courses of movement (semi-active damping). In a known apparatus of this type (U.S. Pat. No. 3,807,678), in a suspension system having two masses, one of which may be one or more wheels of a vehicle and the other of which may be the vehicle body, a passive standard compression spring is disposed between the two masses and is called a passive separating member, with a so-called active damper connected parallel to it. This damper, in which a piston slides in a cylinder, dividing it into two work chambers, is considered an active damper because there is an active intervention, as it were, into the damping properties, or in other words the positive volumetric displacements of the pressure fluid in the respective working halves of the damper by control means. To this end, the two work chambers are connected crosswise and parallel to one another via valves pointing in opposite directions and allowing a flow of the pressure fluid in only one direction; the quantity of pressure fluid then allowed by these valves to pass through is "actively" determined by triggering of the of the valves accordingly by means of suitably prepared sensor signals. Since in this known suspension system the spring itself is completely passive but the damper is conceived of as active in terms of its properties, the overall system in this patent is called semi-active. This term is not logical in the context of the dampers of the present invention, however, which without referring to suspension systems not taken into account can themselves be called semi-active dampers and are therefore so called, for reasons that will be explained in further detail hereinafter.

It is also known to provide so-called active damping means in vehicle wheel suspension systems, see the article, "Active Damping in Road Vehicle Suspension Systems:, published in the journal *Vehicle System Dynamics* 12 (1983), pp. 291–316. This article is also cited because it describes fundamental concepts, in theoretically detailed form, especially for active damping properties.

OBJECT AND SUMMARY OF THE INVENTION

It is an object of the invention, in a damper system, first to simplify the structure drastically and second to embody the damper system such that even though active energy does not need to be supplied, as would actually be required for certain conditions, nevertheless a mode of operation is attainable which substantially integrates the properties of passive and active damping systems simultaneously, and therefore assures optimal functioning under all conditions, without having to make overly stringent demands of the frequency response of the valves or of their reaction bandwidth.

This object is attained by means of the novel features with the advantage that because of the two throttle valves together with the associated check valves, the required frequency response of the valves, the positions of which are triggerred individually and which separately control the damping tension forces and damping compression forces, can be lower; in other words, lower switching speeds are permitted. If the algebraic sign (+) of the relative speed is reversed, then one of the check valves opens, so that an otherwise correspondingly fast reversal of the controlled throttle valves is not necessary.

Another advantage is that separately embodied valve assemblies can also be triggered separately, by one control unit, with so-called passive control signals for the damping and so-called active control signals for the damping and passive and active damping means can be connected in series with one another and embodied as valves of any desired configuration. The so-called passive control signals for the damping means a slow adaptive adaptation of a passive damping component to affect the wheel behavior, as a function of road conditions, while contrarily the so-called active control signals relate to a more-rapid adjustment of an active damping component, which affects vehicle body movement to optimize the comfort of the ride as a function of absolute velocities and of the heave rate, pitch rate and roll rate. The overall damping system can be designed such that the passive damping control increases or decreases the damping action symmetrically with respect to tension or compression, while the active damping control makes the damping asymmetrical as a function of external signals. The overall result is a semi-active damping action in the system.

The only required supply of energy from outside the system is the the slight control energy needed for example for predetermining the valve positions.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 2 schematically illustrates the use of two check valves, associated separately triggerable valves for the pressure stage and tension stage;

FIG. 3 shows the mechanical separation of active and passive damping functions in a series resistor configuration;

DESCRIPTION OF THE PREFERRED EMBODIMENT

Figure 1A:
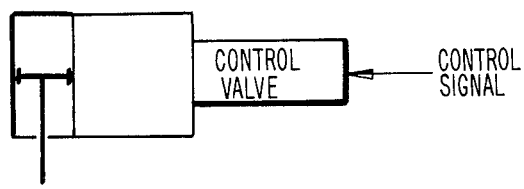
FIG. 1 provides basic schematic illustrations of a semi-active damping control, in which in FIG. 1a, all the control functions are contained in one control unit (damping control computer) for triggering the single control valve, this illustration being provided solely for clarity and not being the subject of the invention.
in FIG. 1b, a division of the control functions into compression and tension forces is possible, with passive and active control signal components again being contained in the control unit (computer)
in FIG. 1c, a mechanical separation of active and passive control functions is realized; and in FIG. 1d; a passive parameter control is shown, combined with an active damping force control, with the systems of FIGS. 1b, 1c and 1d, in that order, corresponding to the more-detailed views provided in FIGS. 2, 3 and 4 as well as FIG. 5.

The invention is based on the following preliminary concepts, which will be discussed first and which encompass a generalized view of damping forces arising in suspension systems. The basis of this discussion in this context is a conventional two-mass model, in which V is the so-called body velocity, or in other words, in the special application here, the velocity of a vehicle body, v is the wheel velocity and $v_0$ is the initial road velocity. As a function of the relative velocity $V_{rel}$, a passive damper would generate a damping force Fd.

Electronically or electrically controlled dampers can be divided into two groups or classifications in terms of their damping properties, as follows:

(1) adjustable dampers of this kind, in which the ratio between the damping force and the relative velocity $V_{rel}$ above the damper can be varied either slowly and continuously or abruptly by switching over to the reverse position; and (2) so-called semi-active dampers, in which the damping force Fd can he modulated quickly as a consequence of control signals that are generated based on other detected motion variables.

Although semi-active dampers are capable of attaining some advantages of active suspension systems, in which only signal powers required are solely for triggering purposes, nevertheless hydraulic actuation switch elements (valves) are required that have a relatively high cut-off frequency in their frequency response, or in other words a correspondingly very fast reaction and switching speed. The present invention relates among others to provisions that limit and facilitate the demands made of the frequency response of the hydraulic switch elements.

Semi-active dampers may be designed such that virtually any kind of lost energy can be used. What is required, in the case of triggering by a low-power signal, are means for affecting the kind of power loss required and for affecting the means for generating this power loss. Since the present invention relates to hydraulic shock absorber systems, in particular for motor vehicles, the following discussion will call the hydraulic actuating means electrohydraulic valves, and they will also be shown as such in the drawings. Whenever a relative velocity arises above the damper embodied in this way, this damper can generate a damping force that is affected by the triggering of the electrohydraulic valve. It will be appreciated that the direction of this damping force (tension or compression) cannot be controlled arbitrarily but instead depends on the instantaneous direction of the relative velocity. At least intermittently, a semi-active damper is therefore in a position to perform the function of a controlled power source.

Referring now to the simple schematic illustrations in FIG. 1a, it will be seen that the required bandwidth of the valve represents an important factor. If in fact only a single valve is provided, then in order for the generatable damping force to be affected by the triggering of this valve, the valve must assume its maximally open position, so that whenever the relative velocity changes its algebraic sign (that is, changes from + to − or vice versa), causing the sign of the generated damping force to be the opposite of that of the damping force now desired and to be generated, the valve brings the generated damping force at least close to zero. Although it is possible for such a system to be realized, nevertherless the demands in terms of type and embodiments of a valve capable of this kind of action are correspondingly stringent. The valve must in fact be capable of being moved very quickly into a fully open state from its virtually closed positions, whenever the relative velocity passes through the zero value. Since the relative velocity is not affected only by the wheel motion but also by the vehicle body motion, the required band widths to be realized in such valves in terms of the switching speed are on the order of 100 Hz.

The invention solves this problem by dividing the valve range in terms of the functional requirements and demands made of the valves, in such a way that the electrohydraulic valves used can have a frequency response with low cut-off frequencies. It should therefore prove possible, in the motor vehicle field, to use hydraulic valves that for controlling vehicle body movements in the 1 to 2 Hz range require a cut-off frequency no higher than approximately 5 to 10 Hz. Wheel motions in the 10 to 15 Hz range are more suitably controlled passively than by means of electrohydraulic valve embodiments and functions.

Figure 1B:
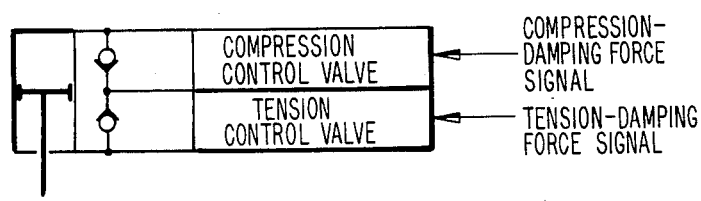

If two hydraulic valves are used in combination with check valves, as in the basic concept schematically illustrated by FIG. 1b, for controlling the forces of tension and compression separately, then the result is for example the more-detailed illustration of an apparatus for damping courses of movement provided in detail in FIG. 2. A piston-cylinder unit 10 includes a piston 11 with a piston rod 11a and an upper work chamber 12a and lower work chamber 12b, the terms "upper" and "lower" being solely in terms of the plane of the drawing. Via pressure lines 13a, 13b, each work chamber communicates with respective associated parallel branch lines 13a', 13a'' and 13b', 13b'', each of which communicates via a throttle valve 14 for the compression stage (compression throttle valve) or a throttle valve 15 for the tension stage (tension throttle valve) with a common hydraulic line 16, which is connected to an equalizing pressure reservoir 17. Parallel to the compression throttle valve 14 is a one-way compression check valve 14a, and parallel to the tension throttle valve 15 is a one-way tension check valve 15a, the check valves also communicating with the equalizing pressure reservoir 17. These check valves 14a and 15a assure that the minimum pressure above or below the piston 11, that is, in the work chambers 12a for the compression stage and 12b for the tension stage, is equal to the reservoir pressure. If the piston 11 moves upward, for example, causing a corresponding increase of pressure in the work chamber 12a, then in any case the tension check valve 15a will open, in order to maintain the minimum pressure in the work chamber 12b.

Damping forces are generated here by the pressure drops across the two throttle valves 14 and 15, which solely for the sake of easier comprehension are shown in simplified form in FIG. 2 and in the ensuing embodiments as controlled slide valves, and the valve members 14', 15' are capable of moving in the axial direction indicated by the double arrows when triggered. As a result, then, a line cross section of variable size is opened or closed, because of the mean restriction for each valve member, depending on the triggering. It will be understood that a great number of other valve types can also be used here.

In FIG. 2, the check valves assume some of the switching functions that in FIG. 1a all had to be performed by the single hydraulic control valve. It is assumed that the control system in charge (a logical, preferably electronic control unit 50 which is only shown in FIG. 2 but applies to each Figure, which is based on the various courses of movement—that is, relative velocities—generates the required control signals for the throttle valves 14, 15 for generating the desired active and passive damping courses) generates a damping force command with respect to the compression stage (compression direction). If in this case the compression throttle valve is partly closed and the tension throttle valve opened, then a damping force of the desired, correct direction is generated, for as long as the relative velocity proceeds in the compression direction. On the other hand, if the algebraic sign of the relative velocity changes, then the compression check valve 14a opens, and the hydraulic pressure fluid (oil) could flow freely through the open tension throttle valve and compression throttle valve. In this case, rapid movement of these control valves is therefore unnecessary; that is, if the control force (for example, the control signal supplied to the magnetic parts of continuously triggerable magnetic valves) generated by the control unit relates to low-frequency vehicle body movements, then the throttle valves can also execute their movement with a low frequency, and the check valves are able to keep pace with fast changes in the algebraic sign of the relative velocity caused by wheel motion. As a result, one of the reasons that is responsible for the aforementioned high cut-off frequency when there is only one control valve as shown in FIG. 1a can be eliminated.

Figure 1C:
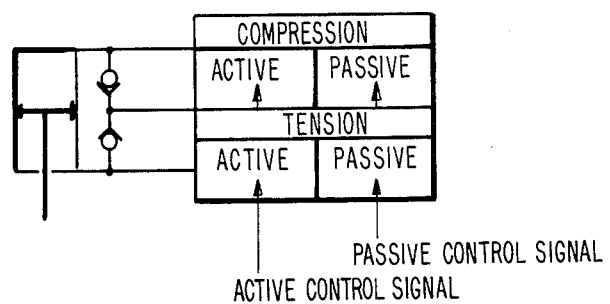

In the schematic semi-active damping control of FIG. 1b in combination with FIG. 2, separate inputs are provided for controlling the tension stage damping forces and the compression stage damping forces; the control unit itself must then combine active and passive damping force components to attain the tension stage or compression stage control forces or control signals. Tests with linearized vehicle models have shown that for motor vehicles having tires it is essential to have both passive damping forces, which are a function of the relative velocity, and active or semi-active damping forces, which are a function of absolute vehicle body motion variables such as the absolute heave rate, pitch rate and roll rate. These theoretical results also point the way to a solution in the non-linearized case, it being understood that the passive damping should be adjustable as a function of the extent of the disturbances resulting from uneven road surfaces or aerodynamic forces or the disturbance caused by the driver himself, such as in steering maneuvers or braking or acceleration processes. The passive damping can be varied or switched over slowly and in a manner adapted to changes in the speed of the motor vehicle or in the characteristics of the road surface, in order to improve handling of the motor vehicle, or to attain greater safety in dangerous situations. It can be demonstrated that the demands made on control valves for passive damping are different from the demands made on control valves that are used for an active damping. It is possible for the functions generating the active and passive forces to be separated mechanically, as shown schematically in FIG. 1c, in which case a practical exemplary embodiment can be found in the more-detailed illustration of FIG. 3; here again, for the sake of simplicity, the hydraulic throttle valves or switching valves are shown in the form of slide valves.

The piston-cylinder unit of the apparatus that damps courses of motion is shown at 20 and it includes a lower portion having an upper (compression) work chamber 21a and a lower (tension) work chamber 21b, as well as a further chamber 22 adjoining it at the top and having the same shape and diameter; this chamber 22 is embodied as an equalizing pressure reservoir, and a piston-rod-like extension 24 of the piston 25 protrudes into the chamber 22, passing through a sealed, tapered guide at 23. The two work chambers 21a, 21b communicate once again via hydraulic connecting lines 26a, 26b with the valve mechanism, which however here has a mechanical division into active and passive damping functions, in the form of respective series-connected hydraulic resistors. The two hydraulic circuits, relating to the compression stage and compression stage, are again separate, as in the exemplary embodiment of FIG. 2, and each branch, connected in series, includes the hydraulic resistor of the passing damping control and the hydraulic resistor of the active damping control. This is a series resistor kind of solution (that is, the two hydraulic resistors are in series, or in line, with one another), where the valve performing the passive damping control is shown at 27 and the valve performing the active damping control is shown at 28. The hydraulic branch line 26a' of the pressure stage thus first passes through a passive damping control region and then through the active damping control region, until in the vicinity of the two check valves 14a' and 15a' provided again here this line is united with the hydraulic pressure line coming from the tension stage. In any event, pressure equalization in the vicinity of the control valve 28 that effects an active damping is possible because this valve varies the damping differentially in the two circuits (compression and tension); in other words, by means of the merely one middle restriction of the valve member 28', one circuit is increasingly throttled while the other is increasingly opened; which circuit is which depends on the direction of movement.

By comparison, at least in the exemplary embodiment shown, the valve member 27' of the control valve 27 for the passive damping is embodied such that this damping is varied in the same direction in both circuits, that is, is either increased or decreased in both circuits; however, it will be understood that the passive damping does not necessarily have to be symmetrical, as is expressed here with the control valve 27.

If it is assumed that the absolute body velocity is directed for instance downward, then the differential throttle valve 28 effecting the active damping must be controlled in its valve member 28' such that the compression damping is increased and the tension damping is decreased. In this case, a movement of this valve need have only the natural body frequency. In very simplified terms, it can therefore be said that the passive damping control increases or decreases the damping with respect to the tension or compression action, while the control valve for the active damping makes the damping asymmetrical as a function of external signals.

A further exemplary embodiment of the mechanical separation of active and passive damping functions, like that basically shown in FIG. 3 which has just been described above, is shown in FIG. 4 and has to do with the possibility of disposing the hydraulic resistors not in series but parallel with one another; in this embodiment, pressure relief valves are also shown, which show that in the practical exemplary embodiment additional hydraulic switch elements are also needed.

Figure 4:
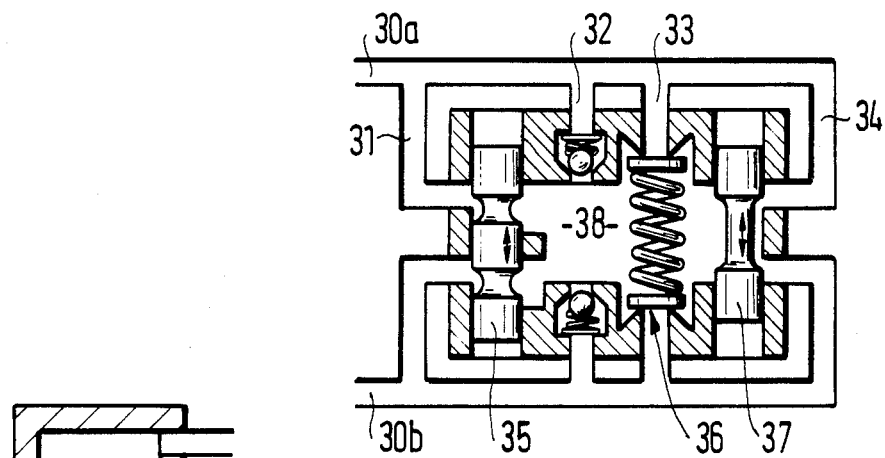
FIG. 4 likewise shows the mechanical separation of active and passive damping functions in a parallel resistor configuration.

In the exemplary embodiment of FIG. 4, in which the piston-cylinder unit is not shown, because it can be embodied like that shown in FIG. 3, the hydraulic lines 30a, 30b coming from the work chambers of the piston-cylinder unit are divided in this case into four parallel branch lines for the compression stage and the tension stage. Since the compression side and tension side are symmetrical with respect to one another, the division of only one of the lines will be described here. A first branch line 31 leads to the control valve 35, here again embodied symmetrically, for the passive damping, and a second branch line 32 is associated with the check valve that is again provided here, while a third branch line 33 leads to a pressure relief valve or overpressure valve 36 disposed in the opposite direction from the associated parallel check valve. Finally, the fourth branch line 34 connects the differential throttle valve 37 with the compression or tension side of the cylinder-piston unit, and the other connections, which may also be called the outlets of the various valves, discharge into a common chamber 38.

The exemplary embodiments described thus far use valves for varying the hydraulic resistance and thus for varying the force/velocity ratio of the damper. This kind of control can be called a parameter control, because the damping force is controlled not directly but rather by means of its ratio to the relative velocity.

Parameter control seems logical for passive damping, because an adjustable ratio between the damping force and the relative velocity is desired. A passive damping is particularly effective in the control of wheel motions and in generating the required contact forces; however, it has disadvantages in terms of the isolation of the vehicle body, which includes aspects having to do with a comfortable ride. On the other hand, the active damping force should not react to signals of the relative velocity, and so it appears logical to suppress the action of the relative velocity in the active damping as much as possible. However, if this is done, by using a parameter control system and force feedback, then the valve must be in a position to operate at frequencies and to perform control functions that are higher than the wheel frequency, so that a wheel motion can be compensated for in the relative velocity.

Figure 1D:
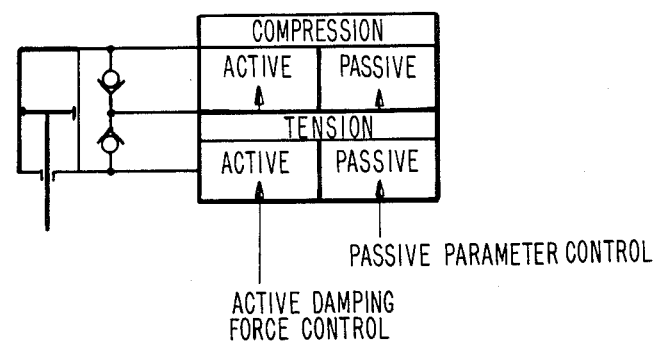
Figure 5:
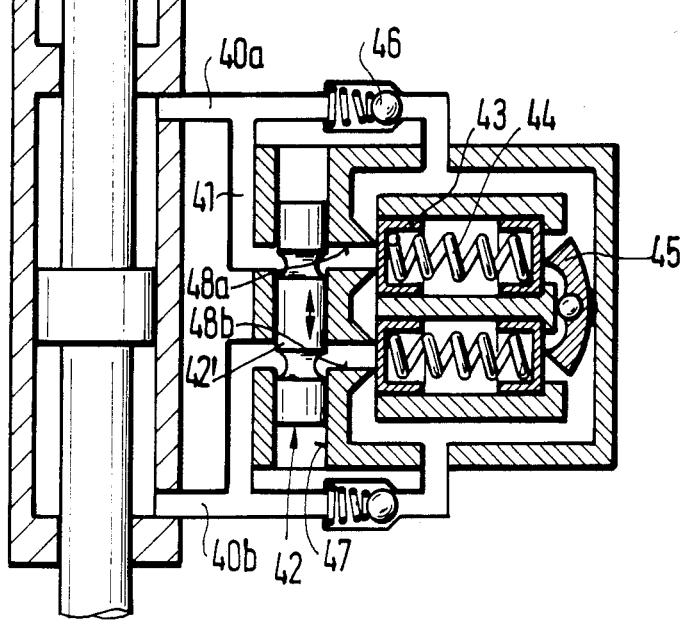
FIG. 5 shows an active damping force control using overpressure valves.

The exemplary embodiment shown in FIG. 5 relates to a concept of more directly controlling or mastering the forces or pressures that arise. The basic concept corresponds to the schematic illustration in FIG. 1d, and in the more-detailed exemplary embodiment of FIG. 5 the structure of the piston-cylinder unit is the same as that of FIG. 3, so that again that unit need not be described in detail.

The procedure is basically such that the pressure drop resulting from the relative velocity in the throttle valve for the passsive damping is added to a pressure drop via an overpressure or relief valve. In other words the arrangement is a series circuit, in hydraulic terms, for the compression stage side and the tension stage side, respectively.

In more detail, the compression stage side pressure line 40a branches off into a first branch line 41 (because the structure for the tension stage side is identical when the embodiment is symmetrical, here again only the region of the compression stage will be described in detail), which leads to the symmetrical throttle valve 42 for passive damping force control. Following this throttle valve, on both sides of the tension or compression stage, there is a respective overpressure valve 43, which is spring-biased so that variations in the flow rate of the pressure medium have only a slight effect on the response pressure of the valves 43. The force of each biasing spring 44 for each overpressure valve 43 is adjustable, with the aid of an element embodied in this case as a rotary actuating member 45, the position of which can be regulated by an adjusting mechanism, as indicated in the drawing. As a result, the response pressure or blow-off pressure of the valves 43 for the active damping force component can be adjusted on alternate sides, that is, asymmetrically or differentially, by means of suitably triggering the rotary actuating member 45. This adjustment, or the rotary actuating member itself, may have a comparatively low frequency response, because the overpressure valve action and the spring action in this region are suitable for keeping the effects of high-frequency changes in the relative velocity away from the pressure components for the active damping, or for intercepting such effects. Reversals in the algebraic sign of the relative velocity are mastered and intercepted by the check valves 46 which are again provide and are disposed in return lines. Since at any given time the rotary actuating member always compresses only one of the two valve springs on which it is capable of acting, in the case of a reversal of relative velocity the active portion of the damping force remains at virtually zero, while the passive component of the damping force remains unchanged.

The structure of the valve assembly shown in FIG. 5 is selected in detail such that preferably in a common housing, first the axially slidably supported valve member 42', with its two symmetrical restrictions, is displaceably guided in a corresponding guide bore 47, in response to the various control commands of the control unit; then, with their respective end regions, the two openings 48a and 48b of the pressure stage and tension stage form simultaneously separate valve seats for the adjoining overpressure valves 43, and in that case when the various valve members rise from their seats the route to the respective associated check valve, or to the other side, is then available.

By means of the invention, it therefore becomes possible to effect a decisive reduction in the required bandwidth, in terms of the frequency response necessary for the actuating elements or electrohydraulic valves, in semi-active dampers, in fact from 100 Hz, for example, to possibly only 5 Hz, and to do so using mechanical elements such as check valves and overpressure valves which assume some of the required control functions in semi-active damping.

All the characteristics included in the description, recited in the ensuing claims and shown in the drawings may be essential to the invention, either individually or in any desired combination with one another.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An apparatus for damping courses of motion of two bodies or masses moving relative to one another and in their absolute positions with variable velocities, in particular for damping resilient wheel suspension systems in vehicles, road vehicles, buses, rail systems and the like, comprising a piston-cylinder unit, said piston-cylinder unit including a piston cylinder, a piston in said piston cylinder, a rod connected to said piston extending to the outside of said piston cylinder, said piston dividing said piston cylinder into an upper work chamber and a lower work chamber, said piston-cylinder unit being connected on one end to a first mass, said piston rod extending from said piston cylinder being connected to a second means, a valve means, said valve means including first and second independently operated control valves, a first pressure line connected to said upper work chamber and to said valve means, a second pressure line connected to said lower work chamber and to said valve means, first and second one-way check valves connected with said first and second pressure lines and to said valve means, said first one-way check valve opening in a direction of fluid flow toward said upper work chamber, said second one-way valve opening in a direction of fluid flow toward said lower work chamber, a valve control unit generating active and passive damping signals for triggering said valve means to control fluid flow from said upper work chamber to said lower work chamber and from said lower work chamber to said upper work chamber, sensors for sending different parameters related to said first and second mass and directing sensor control signals into said valve control unit for controlling said valves in accordance with the sensed signals, said sensor signals being obtained from the relative velocity of said first and second masses to each other, the absolute velocities of the masses independently of one another, the load status, load distribution of the axles, vehicle speed, acceleration in the longitudinal and transverse directions, roadway unevenness, and steering deflection are supplied to the control unit, said valve means being triggered by said valve control unit for active and passive damping, whereupon the active damping signals are referred to the absolute velocity of the bodies or masses to trigger said valve means and the passive damping signals are referred to the relative velocity of the two bodies or masses to effect damping.

2. An apparatus for damping courses of motion of two bodies or masses moving relative to each other as set forth in claim 1 in which said valve means includes first and second parallel pressure branch lines connected to said first and second pressure lines parallel with said piston cylinder, first and second parallel control valves that control fluid flow in said first parallel branch line to and from said first and second pressure lines, said first and second one-way check valves are positioned in said second pressure branch line to prevent fluid flow from said upper and lower work chambers to said first branch line while permitting fluid flow from said first pressure branch line to said second pressure line and from said first pressure branch line to said first pressure line, whereby for a tension stage and compression stage, said first and second parallel control valves are triggered independently of each other by said valve control unit which generates active and passive control signals for triggering said first and second parallel control valves wherein said active damping signals derived from the absolute velocity of the bodies or masses and trigger said first and second control valves in a direction of a differential action, while passive damping signals simultaneously triggering said parallel first and second control valves are derived from the relative velocity for said two bodies or masses to affect damping in the same direction for both movement directions (tension stage, compression stage).

3. An apparatus for damping courses of motion of the two bodies or masses moving relative to each other as set forth in claim 1, in which said valve means includes first and second parallel pressure branch lines in parallel with said piston cylinder, first and second parallel control valves which are positioned in said first parallel branch line with their axes in parallel alignment with said piston cylinder and which control fluid flow from and to said first and second pressure lines, said first and second one-way valves are positioned in said second pressure branch line to prevent fluid flow from said upper and lower work chambers to said first pressure branch line while while permitting fluid flow from said first pressure branch line to said second pressure line and from said first pressure branch line to said first pressure line, whereby for active and passive damping force functions, said parallel control valves are operatively connected with one another hydraulically and said parallel control valves are triggered by said valve control unit separately with active and passive signals, wherein the active damping signals are derived from the absolute velocity of the bodies or masses and the passive damping signals are derived from relative velocity of the bodies or masses, and said parallel control valves for the active and passive damping force functions are embodied such that for the passive damping, an action that is in the same direction (symmetrical) for both movement directions is attained and for the active damping, an asymmetrical (differential) action is attained.

4. An apparatus for damping courses of movement as set forth in claim 1, which includes a compensation pressure reservoir that communicates with said first and second parallel pressure branch lines.

5. An apparatus for damping courses of movement as set forth in claim 2, in which said second parallel control valve is connected to said first parallel control valve in the manner of a series circuit of hydraulic resistors, said first parallel control valve controls tension and compression stage movements in common for passive damping, and for active damping for tension and compression stages said second parallel control valve is connected to an output of said first parallel control valve wherein the outlet of said second parallel control valve and the outlets of said first and second one-way valves are in parallel to said series circuit for active damping.

6. An apparatus for damping courses of movement as set forth in claim 2, which includes an equalizing pressure chamber, and said piston includes a second rod extension that extends from said piston through said upper work chamber into said equalizing pressure chamber.

7. An apparatus for damping courses of movement as set forth in claim 3, in which said second parallel control valve is connected to said first parallel control valve in the manner of a series circuit of hydraulic resistors, said first parallel control valve controls tension and compression stage movements in common for passive damping, and for active damping for tension and compression stages said second parallel control valve is connected to output of said first parallel control valve wherein the outlet of said second parallel control valve and the outlets of said first and second one-way valves are in parallel to said series circuit for active damping.

8. An apparatus for damping courses of movement as set forth in claim 5, in which said first parallel control valve controls fluid flow from and to said first pressure branch line and said second parallel control valve controls fluid flow from and to said second pressure branch line, a fluid chamber is provided between said first and second parallel control valves which interconnects fluid from between said first and second parallel control valves, and said first and second one-way valves restrict flow respectively from said first and second pressure lines into said fluid chamber.

9. An apparatus for damping courses of movement as set forth in claim 8, which includes an overpressure valve which permits fluid flow into said fluid chamber.

10. An apparatus for damping courses of movement as set forth in claim 1, in which said valve means includes first and second parallel pressure lines connected to said upper and lower work chambers, first and second pressure branch lines connected between said first and second pressure lines, a fluid control valve that controls fluid flow through said first pressure branch line, a pair of spring-loaded overpressure valves in said second pressure branch line that controls fluid flow from said fluid control valve to said second pressure branch line, and said one-way valves are connected in said first and second pressure lines to permit flow to said first and second work chambers via said first and second pressure lines from said second pressure branch line.

11. An apparatus for damping courses of movement as set forth in claim 10, in which a rotary actuation member that controls tension on said spring loaded valves is provided, and said rotary actuation member is controlled by said valve control unit.

12. An apparatus for damping courses of movement as set forth in claim 11, which includes an equalizing pressure chamber, and said piston includes a second rod extension that extends from said piston through said upper work chamber into said equalizing pressure chamber.

* * * * *